(12) United States Patent
Itou et al.

(10) Patent No.: US 7,451,067 B2
(45) Date of Patent: Nov. 11, 2008

(54) METHOD FOR ANALYSIS OF CELL STRUCTURE, AND CELL STRUCTURE

(75) Inventors: Motomichi Itou, Nagoya (JP); Yukio Miyairi, Nagoya (JP)

(73) Assignee: NGk Insulators, Ltd., Nagoya (JP)

( * ) Notice: Subject to any disclaimer, the term of this patent is extended or adjusted under 35 U.S.C. 154(b) by 458 days.

(21) Appl. No.: 11/066,241

(22) Filed: Feb. 25, 2005

(65) Prior Publication Data

US 2005/0191615 A1     Sep. 1, 2005

Related U.S. Application Data

(60) Provisional application No. 60/548,861, filed on Mar. 2, 2004.

(30) Foreign Application Priority Data

Feb. 26, 2004   (JP)   .............................. 2004-051792

(51) Int. Cl.
G06F 17/50 (2006.01)
B81B 7/00 (2006.01)
E04C 2/34 (2006.01)
E04C 1/78 (2006.01)

(52) U.S. Cl. .................................. 703/2; 703/7; 428/30

(58) Field of Classification Search ..................... 703/2, 703/5, 6; 428/294.7, 292.1, 98, 30; 702/42
See application file for complete search history.

(56) References Cited

U.S. PATENT DOCUMENTS 5,556,673 A * 9/1996 Giraud ....................... 428/34.4
7,232,605 B2 * 6/2007 Burgueno et al. ........ 428/294.7

2007/0013799 A1 * 1/2007 Hirota et al. ................ 348/311

OTHER PUBLICATIONS

"Testing Methods of Ceramic Monolith Substrates for Automotive Exhaust Gas Catalyst Converters"; Japanese Automobile Standards Organization (JASO) M505-87; pp. 1-9, no english translation.
Takano et al; "Global/Local Modelling of Structures with Local Heterogeneity"; Japan Society of Mechanical Engineers; 642(2000-2), No. 99-0312, pp. 14-20, no date english abs. only.
Gibson et al; "Cellular Solids-Structure & Properties"; Jun. 30, 1993; pp. 475-483.

* cited by examiner

Primary Examiner—Thai Phan
(74) Attorney, Agent, or Firm—Oliff & Berridge, PLC

(57) ABSTRACT

A method for analysis of a cell structure includes a macroanalysis step and a microanalysis step. The macroanalysis step includes replacing a cell structure or a part of the cell structure with an anisotropic solid body having property values of equivalent rigidity characteristics, creating a finite element model of the anisotropic solid body based on the property values, applying an internal temperature distribution or an external pressure to the finite element model of the anisotropic solid body, determining the stress distribution in the anisotropic solid body, and selecting an aimed cell structure of which the stress should be calculated as a cell structure based on the stress distribution. The microanalysis step includes creating a finite element model of the aimed cell structure, and determining the stress distribution in the aimed cell structure based on the finite element model of the aimed cell structure. The structural analysis method is a means for analyzing the stress distribution in the cell structure due to the internal temperature distribution or external pressure which can be realized by using general-purpose computer software and hardware without performing a simulation test and making a large investment.

11 Claims, 20 Drawing Sheets
(14 of 20 Drawing Sheet(s) Filed in Color)

FIG.29(a)
FIG.29(b)
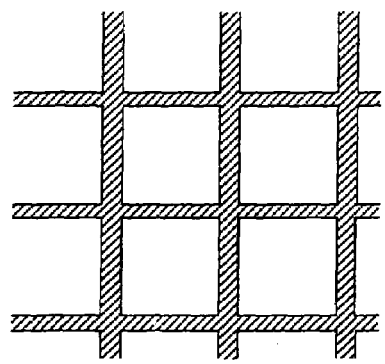
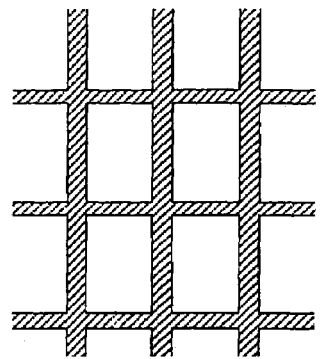
FIG.29(c)
FIG.29(d)
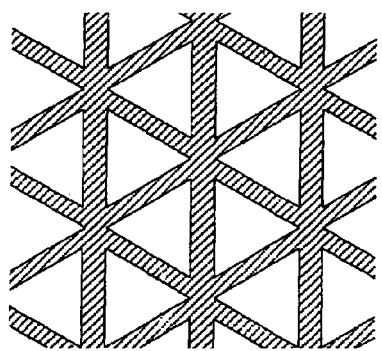
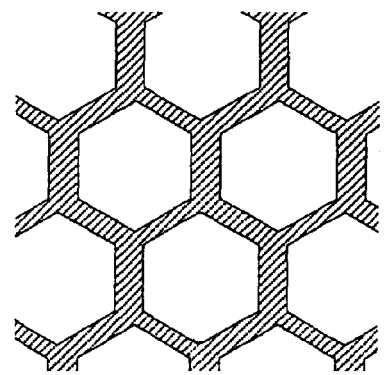

METHOD FOR ANALYSIS OF CELL STRUCTURE, AND CELL STRUCTURE

This nonprovisional application claims the benefit of U.S. Provisional Application No. 60/548,861, filed Mar. 2, 2004.

BACKGROUND OF THE INVENTION AND RELATED ART

The present invention relates to a method for analysis of a cell structure using a finite element method which is capable of efficiently and quickly determining the stress distribution which occurs inside the cell structure when a partial or non-uniform temperature change occurs inside the cell structure or when an external pressure is applied to the outer circumference (body face and end face) of the cell structure, and to a cell structure which has been subjected to stress analysis using the structural analysis method.

A honeycomb structure as an example of the cell structure has been used as a catalyst substrate for an exhaust gas purification device used for a heat engine such as an internal combustion engine or combustion equipment such as a boiler, a liquid fuel or gaseous fuel reformer, or the like. The honeycomb structure is also used as a filter for trapping and removing particulate matter contained in dust-containing fluid such as exhaust gas discharged from a diesel engine.

In the honeycomb structure used for such purposes, a nonuniform temperature distribution tends to occur inside the honeycomb structure due to a rapid temperature change or local heating of exhaust gas or the like, and pressure tends to be applied to the outer wall during canning. The stress which occurs inside the honeycomb structure due to the nonuniform temperature distribution or the external pressure may cause cracks to occur. In particular, when the honeycomb structure is used as a filter (diesel particulate filter: DPF) for trapping particulate matter contained in exhaust gas from a diesel engine, since the honeycomb filter is regenerated by burning and removing the deposited carbon particulate matter, a local increase in the temperature inevitably occurs. This increases the stress which occurs inside the honeycomb structure or on the outer wall (body face) or the end face, whereby cracks easily occur.

In general, it is desirable that the honeycomb structure used for the above-mentioned purposes have a wall thickness as small as possible. This is because the specific surface area can be increased when the honeycomb structure is used as a catalyst substrate and the air-flow resistance of exhaust gas or the like can be reduced when the honeycomb structure is used as a filter. However, since the structural strength is reduced as the wall thickness becomes smaller, judgment may be required as to whether or not the structural strength of the honeycomb structure having a predetermined wall thickness can withstand the stress which may occur under the use condition.

Conventionally, whether or not the honeycomb structure can withstand a predetermined stress has been confirmed by performing a use state simulation test using a method of increasing the temperature of the honeycomb structure in an electric kiln and thereafter immediately placing the resultant under normal temperature condition, a method of causing exhaust gas generated by burning diesel fuel using a burner to pass through the honeycomb structure and rapidly changing the temperature of the exhaust gas, a method of applying a hydrostatic pressure based on an isostatic strength test (Japanese Automobile Standards Organization (JASO) standard M505-87 published by Automotive Engineers of Japan, Inc.), or the like.

However, the above test method takes time, and poses limitations on possible test conditions. It is known that the stress which occurs in the honeycomb structure due to the internal temperature distribution or the external pressure may change depending on not only the wall thickness, but also the cell size, the property values of the constituent material, and the like. Therefore, development of a means for analyzing the stress distribution caused by the temperature distribution or the external pressure without performing a test has been demanded.

However, when applying a finite element analysis method for analyzing the stress distribution in the honeycomb structure, since the honeycomb structure has a three-dimensional structure in which many minute cells are assembled, the amount of calculation is increased to a large extent, and it is difficult to deal with such a large amount of calculation using commercially-available computer software and hardware. A supercomputer may perform such a calculation, but even that requires a long period of time. Moreover, such an investment increases the product cost, whereby competitiveness is weakened.

Prior art literature as to the means for analyzing the stress distribution inside the cell structure such as the honeycomb structure has not been found. As prior art literature dealing with a structural analysis of a structure in general, "Japan Society of Mechanical Engineers papers (A) Vol. 66, No. 642 (2000-2), paper No. 99-0312, pp. 14-20 (hereinafter called "non-patent document 1")" proposes an efficient numerical analysis technique for a structure with local heterogeneity. In more detail, when analyzing a structure with local heterogeneity, it is necessary to determine not only deformation of the entire structure, but also the stress distribution near the heterogeneity, and the entire structure must be subdivided if modeling of the local region is given priority, whereby the data creation time and the calculation cost are increased to an impractical level. However, the non-patent document 1 suggests that this problem can be resolved by analyzing the local heterogeneity using a finite element mesh superposition method, and analyzing the remaining structure by a finite element method using a shell-solid connection in which the entire structure is modeled using the shell elements and the vicinity of the heterogeneity is modeled using the solid elements.

However, the means and the analytical example disclosed in the non-patent document 1 can be applied only when the region which requires a detailed analysis (local heterogeneity in the non-patent document 1 and the copper region in the tungsten plate in the analytical example) has been determined in advance. Therefore, it is difficult to apply the means disclosed in the non-patent document 1 as the means for analyzing the stress distribution which occurs inside the honeycomb structure used as a catalyst substrate or a filter when a temperature change occurs inside the honeycomb structure or pressure is applied from the outside. This is because the heterogeneity cannot be determined in advance since the stress distribution may change depending on the internal temperature change or the external pressure.

SUMMARY OF THE INVENTION

The present invention has been achieved in view of the above-described situation. An objective of the present invention is to provide a means for analyzing the stress distribution in the cell structure caused by the internal temperature distribution or external pressure which can be realized by using general-purpose computer software and hardware without performing a simulation test and making a large investment.

As a result of extensive studies, it was found that the above objective can be achieved by the means as described below.

Specifically, according to the present invention, there is provided a method for analysis of a cell structure for analyzing stress which occurs inside the cell structure due to a temperature distribution which occurs inside the cell structure or pressure applied from outside of the cell structure, the cell structure being in a shape of a tubular body including two end faces and a body face which connects the two end faces, a plurality of cells partitioned by wall sections being formed inside the tubular body in an axial direction of the tubular body, and the cell structure including a repeating structure formed by the wall sections and the cells, the method comprising: a macroanalysis step which includes replacing the cell structure or a part of the cell structure with an anisotropic solid body having property values of equivalent rigidity characteristics, creating a finite element model of the anisotropic solid body based on the property values, applying an internal temperature distribution or an external pressure to the finite element model of the anisotropic solid body, calculating the stress, and selecting an aimed cell structure of which the stress should be calculated as a cell structure based on a stress distribution in the anisotropic solid body; and a microanalysis step which includes creating a finite element model of the aimed cell structure, and calculating the stress based on the finite element model of the aimed cell structure to determine a stress distribution in the aimed cell structure.

The structural analysis used herein refers to calculating the stress in each selected portion of the cell structure (or part of the cell structure) or the stress distribution or deformation over the entire cell structure (or part of the cell structure) based on a given condition. The given condition is the internal temperature distribution (may be simply referred to as "temperature distribution") or the external pressure. The temperature distribution or the external pressure may be applied to the finite element model using a conventional means according to the finite element method. The temperature distribution which occurs inside the cell structure is a nonuniform temperature distribution caused by a thermal load, and indicates the temperature distribution when a partial or nonuniform temperature change occurs inside the cell structure. The amount and the distribution of the stress change in accordance with the change in the temperature distribution, if the temperature distribution changes. The anisotropic solid body means a formed product having the same external shape as the external shape of the structural analysis target cell structure, but the filled cells, and of which properties vary, depending on the direction. Furthermore, it is described that the aimed cell structure of which the stress should be calculated is selected, however, the selection, that is, the judgment as to the aimed cell structure to be selected may be arbitrarily made without limiting the region.

In the method for analysis of a cell structure according to the present invention, the part of the cell structure replaced with the anisotropic solid body is preferably a piece obtained by equally dividing the entire cell structure into two, four, or eight. Specifically, the number of divisions is preferably at most three such as 2, 4, or 8. The number of divisions is the number limited to realize division in which each divided cell structure has a similar shape in a cell structure which is in the shape of a tube of which the cross section perpendicular to the axial length is circular and in which the cell shape has symmetry. The number of divisions is further limited in a cell structure in the shape of a tube of which the cross section perpendicular to the axial length is elliptical, in which the number of divisions is two or four, specifically, the part of the cell structure replaced with the anisotropic solid body is preferably a piece obtained by equally dividing the entire cell structure into two or four.

In the method for analysis of a cell structure according to the present invention, it is preferable that the rigidity characteristics of the anisotropic solid body in the macroanalysis step be expressed by the following numerical equation (1).

$$\begin{pmatrix} \sigma x \\ \sigma y \\ \sigma z \\ \tau xy \\ \tau yz \\ \tau zx \end{pmatrix} = \begin{pmatrix} K11 & K12 & K13 & 0 & 0 & 0 \\ K21 & K22 & K23 & 0 & 0 & 0 \\ K31 & K32 & K33 & 0 & 0 & 0 \\ 0 & 0 & 0 & K44 & 0 & 0 \\ 0 & 0 & 0 & 0 & K55 & 0 \\ 0 & 0 & 0 & 0 & 0 & K66 \end{pmatrix} \begin{pmatrix} \varepsilon x \\ \varepsilon y \\ \varepsilon z \\ \gamma xy \\ \gamma yz \\ \gamma zx \end{pmatrix} \quad (1)$$

σx: X-axis direction normal stress, σy: Y-axis direction normal stress, σz: Z-axis direction (honeycomb passage direction) normal stress, τxy: Y-axis direction shear stress in a plane perpendicular to the X axis, τyz: Z-axis direction shear stress in a plane perpendicular to the Y axis, τzx: X-axis direction shear stress in a plane perpendicular to the Z axis, εx: X-axis direction tensile (or compression) strain, εy: Y-axis direction tensile (or compression) strain, εz: Z-axis direction tensile (or compression) strain, γxy: XY inplane shear strain, γyz: YZ inplane shear strain, γzx: ZX inplane shear strain, K11, K12, K13, K21, K22, K23, K31, K32, K33, K44, K55, and K66: moduli of elasticity.

The numerical equation (1) indicates the relationship between the stress and the strain. In the numerical equation (1), the left side indicates the stress, the right term in the right side indicates the strain, and the left term in the right side indicates the modulus of elasticity matrix. The modulus of elasticity matrix is indicated as a matrix containing 12 moduli of elasticity as the components. In the left side, the component indicated by σ indicates the normal stress, and the component indicated by τ indicates the shear stress. In the right term in the right side, the component indicated by ε indicates the tensile (or compression) strain, and the component indicated by γ indicates the shear strain. The moduli of elasticity K11, K22, and K33 are Young's moduli, and the moduli of elasticity K44, K55, and K66 correlate to the shear modulus. As reference literature for the description in this paragraph, "Cellular Solids—Structure & Properties, first edition (Jun. 30, 1993), publisher: Uchida Rokakuho Publishing Co., Ltd., author: L. J. Gibson and M. F. Ashby, translator: Masayuki Otsuka, pp. 475-482" can be given.

The shear stress and the shear strain are described below using an example shown in FIG. 30. When a shear force F acts in the axial direction on the upper surface of an object in the shape of a rectangular parallelepiped having an upper surface area of A and a height of L disposed in the coordinate system shown in FIG. 30, an X-axis direction shear stress τyx=F/A in a plane perpendicular to the Y axis occurs in the object, and an XY inplane shear distortion γxy is λ/L.

The numerical equation (1) may be derived by creating a finite element model as one unit of the cell structure or the part of the cell structure which can be considered to be the repeating structure, calculating the amount of displacement at a representative point after applying an external pressure to the finite element model in a plurality of directions, and calculating each of the moduli of elasticity based on the external pressure and the amount of displacement. The numerical equation (1) may be derived using a homogenization method.

In the method for analysis of a cell structure according to the present invention, it is preferable that the aimed cell structure be selected in the macroanalysis step by selecting a position including a maximum value of stress E2 calculated using the following numerical equation (2).

$$E2 = C1\sigma_1 x + C2\sigma_1 y + C3\sigma_1 z + C4\tau_1 xy + C5\tau_1 zx + C6\tau_1 yz \quad (2)$$

$\sigma_1 x$: X-axis direction normal stress calculated in the macroanalysis step, $\sigma_1 y$: Y-axis direction normal stress calculated in the macroanalysis step, $\sigma_1 z$: Z-axis (honeycomb passage direction) direction normal stress calculated in the macroanalysis step, $\tau_1 xy$: Y-axis direction shear stress in a plane perpendicular to the X axis calculated in the macroanalysis step, $\tau_1 zx$: X-axis direction shear stress in a plane perpendicular to the Z axis calculated in the macroanalysis step, $\tau_1 yz$: Z-axis direction shear stress in a plane perpendicular to the Y axis calculated in the macroanalysis step, C1: influence weighting factor of the X-axis direction normal stress $\sigma_1 x$, C2: influence weighting factor of the Y-axis direction normal stress $\sigma_1 y$, C3: influence weighting factor of the Z-axis direction normal stress $\sigma_1 z$, C4: influence weighting factor of the Y-axis direction shear stress $\tau_1 xy$ in a plane perpendicular to the X axis, C5: influence weighting factor of the X-axis direction shear stress $\tau_1 zx$ in a plane perpendicular to the Z axis, and C6: influence weighting factor of the Z-axis direction shear stress $\tau_1 yz$ in a plane perpendicular to the Y axis.

In the numerical equation (2), the values C1 to C6 differ depending on the thickness of the wall section (partition wall), the cell pitch, and the Young's modulus and the Poisson ratio of the material for the cell structure. The values C1 to C6 may be determined in advance by the values of the stress which occurs when applying only the external pressure (load component) to the finite element model of the part of the cell structure in each direction (X-axis direction, Y-axis direction, and Z-axis direction).

In the method for analysis of a cell structure according to the present invention, it is preferable to calculate the displacement in the macroanalysis step together with the stress when applying the internal temperature distribution or the external pressure to the finite element model of the anisotropic solid body, and to provide the displacement as a boundary condition for the finite element model of the aimed cell structure in the microanalysis step.

In the microanalysis step, it is preferable that the number of element divisions in the thickness direction be two or more in the wall section in the finite element model of the aimed cell structure. The number of element divisions is preferably three or more, and still more preferably four or more.

In the microanalysis step, it is preferable that the number of element divisions be two or more in a wall intersection curved section in the finite element model of the aimed cell structure. The number of element divisions is preferably three or more, and still more preferably four or more.

According to the present invention, there is provided a cell structure of which a stress distribution has been analyzed by using the above-described method for analysis of a cell structure, the cell structure having a material fracture stress value greater than a maximum value of the stress which occurs inside the cell structure due to the temperature distribution which occurs inside the cell structure or the pressure applied from outside of the cell structure.

Since the method for analysis of a cell structure according to the present invention is performed by the macroanalysis step of calculating the stress distribution in the anisotropic solid body equivalent to the cell structure and the microanalysis step of calculating the stress distribution in the aimed cell structure selected based on the result of the macroanalysis step, the amount of calculation required for the stress calculation in each step can be significantly reduced. This is because the number of elements, the number of nodes, and the number of degrees of freedom of the finite element model in each step are significantly reduced. In the case where the number of elements, the number of nodes, and the number of degrees of freedom of the entire cell structure amount to several tens of millions, the number of elements, the number of nodes, and the number of degrees of freedom of the equivalent anisotropic solid body in the macroanalysis step may amount to several tens of thousands, although the numbers may differ depending on the conditions such as the cell pitch and the wall thickness of the cell structure. In the microanalysis step, since the stress is calculated as the cell structure, the number of nodes, the number of elements, and the number of degrees of freedom amount to several tens of thousands as in the macroanalysis step. However, since the target region is selected and limited, the number of elements, the number of nodes, and the number of degrees of freedom of the finite element model as the calculation target are significantly small in comparison with those of the entire cell structure.

If the target replaced with the anisotropic solid body in the macroanalysis step is the part of the cell structure which is a piece obtained by equally dividing the entire cell structure into two, four, or eight, which is the preferable mode of the present invention, the number of elements, the number of nodes, and the number of degrees of freedom of the finite element model can be further reduced in comparison with the case of replacing the entire cell structure with the anisotropic solid body, whereby the amount of stress calculation is reduced.

Therefore, the stress can be calculated by using commercially-available general-purpose computer software and hardware, and the time required for the processing is significantly reduced. This makes it unnecessary to make an investment in an extremely high performance computer. Since the simulation can be repeatedly performed while changing the internal temperature distribution or the external pressure, the ratio of the internal temperature distribution or the external pressure to the stress at which cracks may occur in the cell structure can be quantified based on the use condition without using a simulation test, whereby a cell structure optimum for the application can be manufactured.

In the method for analysis of a cell structure according to the present invention, since the aimed cell structure of which the stress should be calculated in the microanalysis step is selected based on the stress distribution in the anisotropic solid body obtained by the macroanalysis step, it is unnecessary that the region which requires a detailed analysis (corresponding to the local heterogeneity in the non-patent document 1 and the aimed cell structure in the present specification) be determined in advance differing from the non-patent document 1. Therefore, the method for analysis of a cell structure according to the present invention may be applied as a means for efficiently and quickly analyzing the stress inside the cell structure used as a catalyst substrate or a filter of which the distribution varies when a temperature change occurs inside the cell structure or pressure is applied from the outside.

In the method for analysis of a cell structure according to the present invention, since the number of element divisions in the thickness direction is preferably set to two or more in the wall section in the finite element model of the aimed cell structure in the microanalysis step, the stress concentration on the surface of the wall section can be accurately detected. If the number of element divisions is less than two, the stress concentration on the surface of the wall section may not be accurately detected. Moreover, since the number of element divisions is preferably set to two or more in the wall intersection curved section in the finite element model of the aimed cell structure in the microanalysis step, the predictive accuracy of the stress value in the wall intersection curved section is excellent. If the number of element divisions is less than two, the predictive accuracy of the stress value may be decreased.

Since the cell structure according to the present invention has been subjected to a stress distribution analysis by using the method for analysis of a cell structure according to the present invention, and has a material fracture stress value greater than the maximum value of the stress which occurs inside the cell structure due to the temperature distribution which occurs inside the cell structure or the pressure applied from outside, the cell structure rarely breaks during the actual use.

BRIEF DESCRIPTION OF THE DRAWINGS

The patent or application file contains at least one drawing executed in color. Copies of this patent or patent application publication with color drawings will be provided by the Office upon request and payment of the necessary fee.

FIGS. 29(a), 29(b), 29(c), and 29(d) are enlarged diagrams showing the shape of cells in a plane perpendicular to the axial direction of a tubular body.

DESCRIPTION OF PREFERRED EMBODIMENT

Figure 1A:
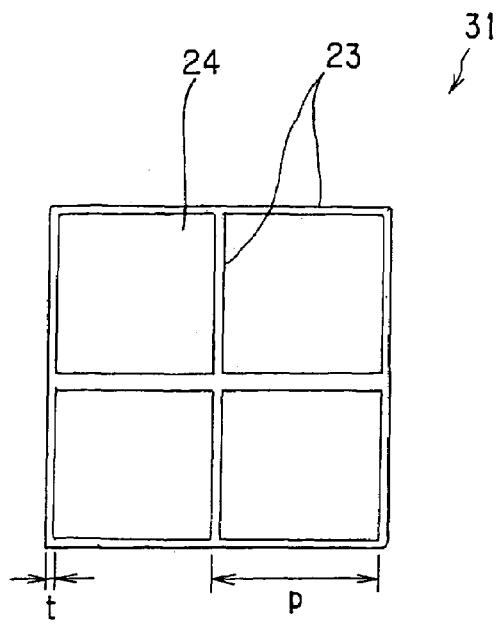
FIG. 1(a) is a partially enlarged diagram showing an example of a unit structure portion of a cell structure (honeycomb structure) according to a method for analysis of a cell structure according to the present invention.

Embodiments of the method for analysis of a cell structure according to the present invention are described below in detail with reference to the drawings. However, the present invention should not be construed as being limited to the following embodiments. Various alterations, modifications, and improvements may be made within the scope of the present invention based on knowledge of a person skilled in the art. For example, although the drawings show preferred embodiments of the present invention, the present invention is not limited to modes shown in the drawings or to information shown in the drawings. Although means similar to or equivalent to means described in the present specification may be applied when carrying out or verifying the present invention, preferable means are means as described below.

A cell structure according to the present invention, which is the target of the method for analysis of a cell structure according to the present invention, is described below. The cell structure according to the present invention satisfies the following necessary conditions 1) to 3).

1) The cell structure has an external shape in the shape of a tubular body including two end faces and a body face which connects the two end faces. This means that the external shape is tubular, and is synonymous even if the external shape is expressed as pillar-shaped. The specific external shape is not limited. The shape of the end face or the cross-sectional shape perpendicular to the axial direction of the tubular body may be square, rectangular, another quadrilateral, circular, elliptical, another shape drawn by a curve, triangular, polygonal with four or more sides, a composite shape consisting of a curve and a straight line, or the like.

2) The cell structure includes a plurality of cells partitioned by wall sections which are formed inside the tubular body in the axial direction of the tubular body. Specifically, the cell structure is neither a hollow tube nor a solid pillar, but is tubular in which the cells are formed. The axial direction of the tubular body corresponds to the direction which connects the two end faces. The shape of the cells is not limited. The shape of the cells in a plane perpendicular to the axial direction of the tubular body may be square, rectangular, another quadrilateral, circular, elliptical, another shape drawn by a curve, triangular, polygonal with four or more sides, a composite shape consisting of a curve and a straight line, or the like.

3) The cell structure includes a repeating structure formed by the wall sections and the cells. This also includes the case where, when the cell structure is divided into two or more sections along a plane in the axial direction of the tubular body, each divided section becomes an identical structure. In this case, each divided section is one unit of the repeating structure. Although all the divided sections are not necessarily identical, most of the divided sections preferably have an identical structure and shape. The shape of the cells partitioned by the wall sections in one unit is not limited, and cells having various shapes may exist. Specifically, a plurality of cells in the shape of a triangle, square, rectangle, another quadrilateral, circle, ellipse, another shape drawn by a curve, polygon with five or more sides, composite shape consisting of a curve and a straight line, or the like may be included in one unit in a plane perpendicular to the axial direction of the tubular body.

Figure 2:
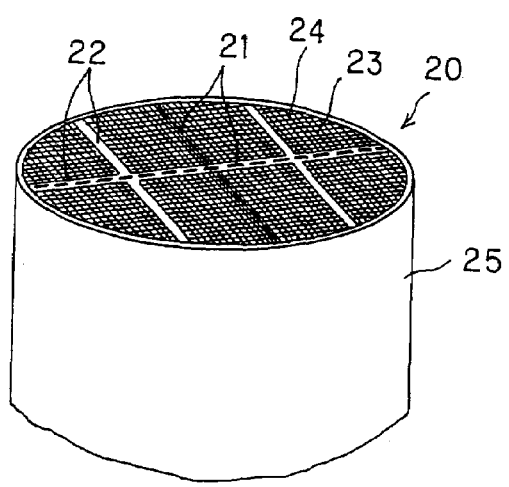
FIG. 2 is an oblique diagram showing a honeycomb structure as an example of a cell structure.

A honeycomb structure can be given as an example of the cell structure according to the present invention. FIG. 2 is an oblique diagram showing a honeycomb structure as an example of the cell structure. FIGS. 29($a$), 29($b$), 29($c$), and 29($d$) are enlarged diagrams showing the shape of the cells in a plane perpendicular to the axial direction of the tubular body, the shape of the cells being square (FIG. 29($a$)), rectangular (FIG. 29($b$)), triangular (FIG. 29($c$)), and hexagonal (FIG. 29($d$)). A honeycomb structure 20 shown in FIG. 2 includes an outer wall 25 which forms the body face, partition walls 23 as the wall sections disposed inside the outer wall 25, and a plurality of cells 24 partitioned by the partition walls 23, and is formed by the repeating structure consisting of the partition walls 23 and the cells 24. In the honeycomb structure 20, the shape of the cells (shape of the cells open on the end face) is square as shown in FIG. 29($a$), and one unit of the repeating structure consists of one cell 24 and the partition walls 23 which form (partition) the cell 24.

Figure 27:
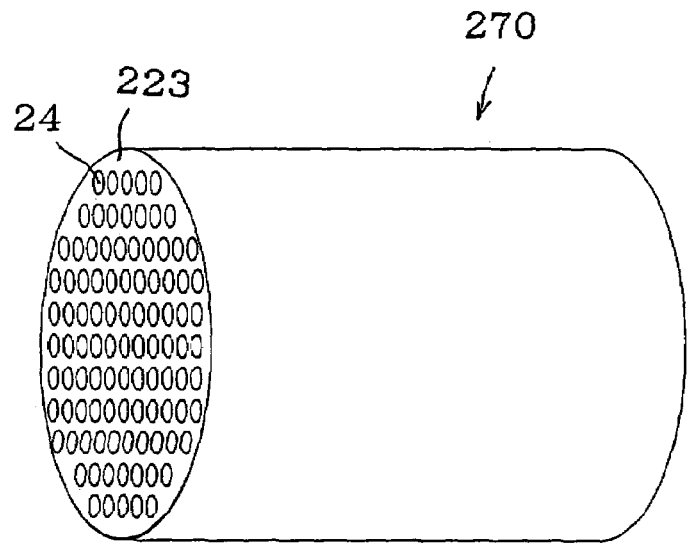
FIG. 27 is an oblique diagram showing a monolith structure as an example of a cell structure.
Figure 28A:
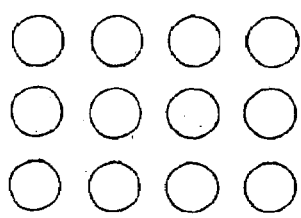
FIGS. 28(a), 28(b), 28(c), and 28(d) are enlarged diagrams showing the shape and arrangement of cells in a plane perpendicular to the axial direction of a tubular body.
Figure 28C:
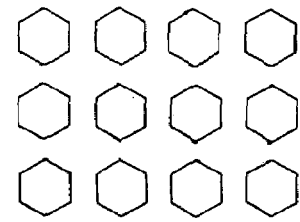
Figure 28B:
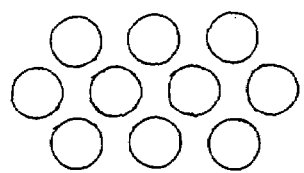
Figure 28D:
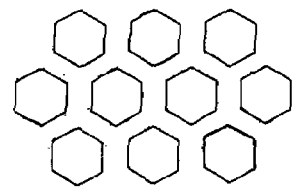
Figure 30:
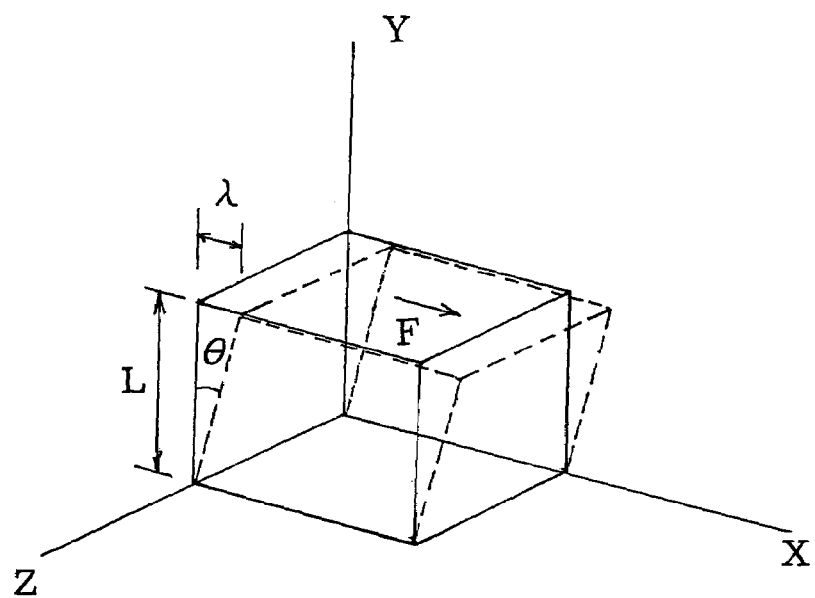
FIG. 30 is a schematic diagram illustrative of shear stress and shear strain.

A monolith structure can be given as another example of the cell structure according to the present invention. FIG. 27 is an oblique diagram showing an example of a monolith structure as the cell structure, and FIGS. 28($a$), 28($b$), 28($c$), and 28($d$) are enlarged diagrams showing the shape and the arrangement of the cells in a plane perpendicular to the axial direction of the tubular body, the cells being circular and disposed in a lattice arrangement (FIG. 28($a$)), circular and disposed in a checkered flag pattern arrangement (FIG. 28($b$)), hexagonal and disposed in a lattice arrangement (FIG. 28($c$)), and hexagonal and disposed in a checkered flag pattern arrangement (FIG. 28($d$)). A monolith structure 270 shown in FIG. 27 includes an integral wall section 223 which forms the body face and the end faces, and a plurality of cells 24 formed through the wall section 223, and is formed by the repeating structure consisting of the wall section 223 and the cells 24. In the monolith structure 270, the shape and the arrangement of the cells (shape and arrangement of the cells open on the end face) are respectively circular and a lattice arrangement as shown in FIG. 28($a$), and one unit of the repeating structure consists of one cell 24 and a part of the wall section 223 which forms the cell 24.

The structural analysis method is described below. The method for analysis of a cell structure according to the present invention is a method of analyzing the stress distribution which occurs inside the cell structure due to the temperature distribution which occurs inside the cell structure. The honeycomb structure 20 shown in FIG. 2 as an example of the cell structure is in the shape of a tubular body, and is a structure in which the horizontal cross section (plane perpendicular to the axial direction of the tubular body) in FIG. 2 is elliptical, which has a cell structure including the outer wall 25 and a number of cells 24 formed by the partition walls 23 inside the outer wall 25, and in which six honeycomb segments are bonded through connection sections 22.

For example, when causing a catalyst to be carried on the partition walls 23 of the honeycomb structure 20 and using the honeycomb structure 20 as a catalyst substrate for an exhaust gas purification device or the like, high-temperature exhaust gas passes through the cells to apply heat to the honeycomb structure 20, and the temperature of only the center section is generally locally increased, whereby a non-uniform temperature distribution is formed. Since all the partition walls 23 including the outer wall 25 are connected to restrict one another, cracks may occur in the partition wall 23 or the outer wall 25 due to occurrence of different degrees of stress in each section caused by different temperatures in each section. The present invention analyzes the stress distribution which occurs inside the honeycomb structure as an example of the cell structure due to the internal temperature distribution or the external pressure applied to the honeycomb structure by using a finite element method to enable a section in which cracks tend to occur to be specified without performing a simulation test.

Figure 3:
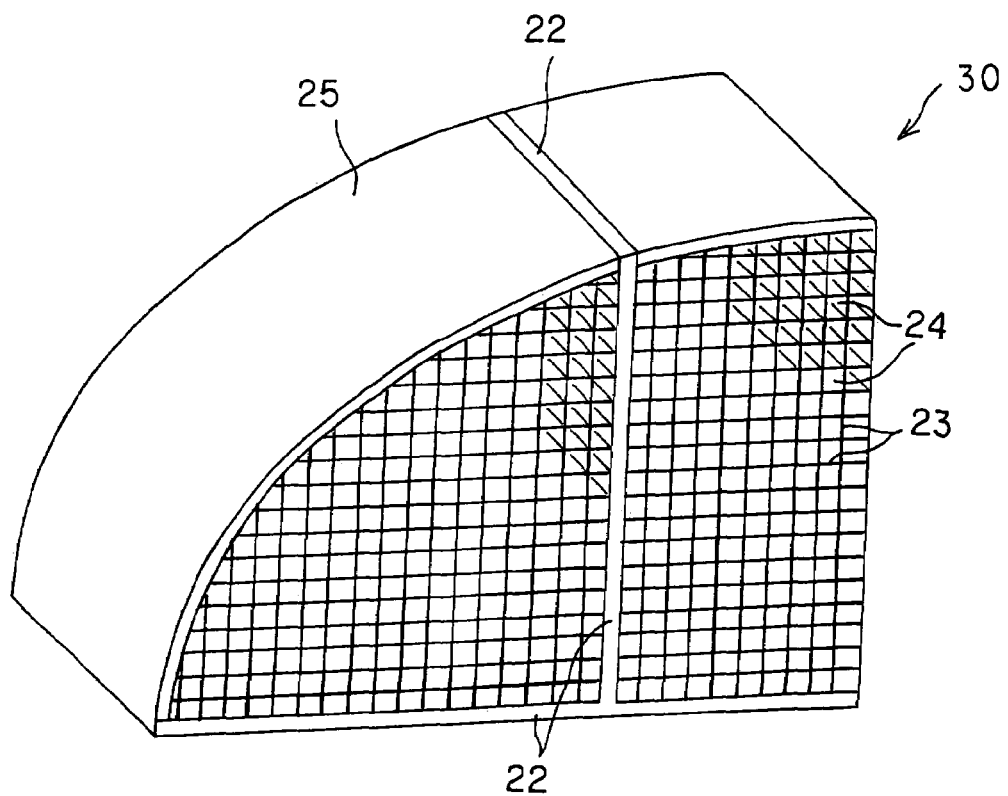
FIG. 3 is an oblique diagram showing a honeycomb structure obtained by dividing the honeycomb structure shown in FIG. 2 into four.

A macroanalysis step is described below. First, the honeycomb structure as an example of the cell structure is replaced with an anisotropic solid body having property values of equivalent rigidity characteristics. Since the cross section of the honeycomb structure 20 is elliptical, the replacement target may be a part of the honeycomb structure 20 obtained by dividing the honeycomb structure 20 shown in FIG. 2 into four along cutting lines 21 instead of the entire honeycomb structure 20. FIG. 3 is an oblique diagram showing a honeycomb structure 30 in the shape of a tubular body having a fan-shaped cross section which is obtained by dividing the honeycomb structure 20 into four.

When replacing the honeycomb structure 30 with an anisotropic solid body having property values of equivalent rigidity characteristics, the rigidity characteristics of the anisotropic solid body are expressed by the above numerical equation (1). Each term in the numerical equation (1) is calculated as follows.

Figure 1B:
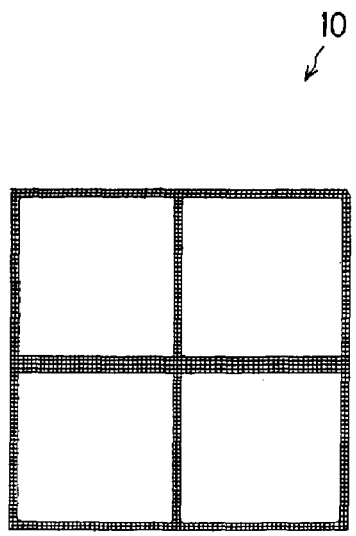
FIG. 1(b) is a diagram showing a finite element model of the unit structure portion of the cell structure (honeycomb structure) shown in FIG. 1(a).

A finite element model of one unit of the cell structure of the honeycomb structure 30 which can be considered to be the repeating structure is created. FIG. 1($a$) is a side view showing a unit structure portion (four cells and partition walls which form the four cells) which is a part of the honeycomb structure 30, which is a part of the honeycomb structure 20 as the structural analysis target, and is one unit which can be considered to be the repeating structure, and FIG. 1(b) is a diagram showing a finite element model of the unit structure portion. In a unit structure portion 31 (honeycomb structure 30) shown in FIG. 1(a), the cells 24 are formed at a partition wall thickness of t and a cell pitch of p.

After providing a Young's modulus E and a Poisson ratio ν as conditions for mechanical properties of the material which forms the unit structure portion 31 (honeycomb structure 30), a stress analysis is performed for six cases where σx, σy, σz, τxy, τyz, and τzx are individually applied to the finite element model 10 shown in FIG. 1(b) as the external pressure (virtual stress) in a plurality of directions, whereby outputs εx, εy, εz, γxy, γyz, and γzx are respectively obtained. Substituting these outputs into the numerical equation (1) yields each term in the numerical equation (1) as the solution of the simultaneous equations.

A homogenization method may be used as another method for calculating each term in the numerical equation (1). After providing the Young's modulus E and the Poisson ratio ν as the mechanical properties of the material which forms the unit structure portion 31 (honeycomb structure 30), an equation obtained by descretizing the finite element model of the unit structure portion 31 is calculated based on the idea of the homogenization method. When the honeycomb structure 30 (FIG. 3) is formed by the repeated arrangement of the unit structure portions 31, each term in the numerical equation (1) can be directly calculated from the discretized equation by taking into consideration the entire relationship between the adjacent elements of two adjacent unit structure portions 31 due to repetition of the unit structure portions 31 (for example, the lower right edge element of the unit structure portion 31 which makes up the honeycomb structure 30 is continuous with the upper right edge element of another unit structure portion 31 adjacent thereto).

Figure 4:
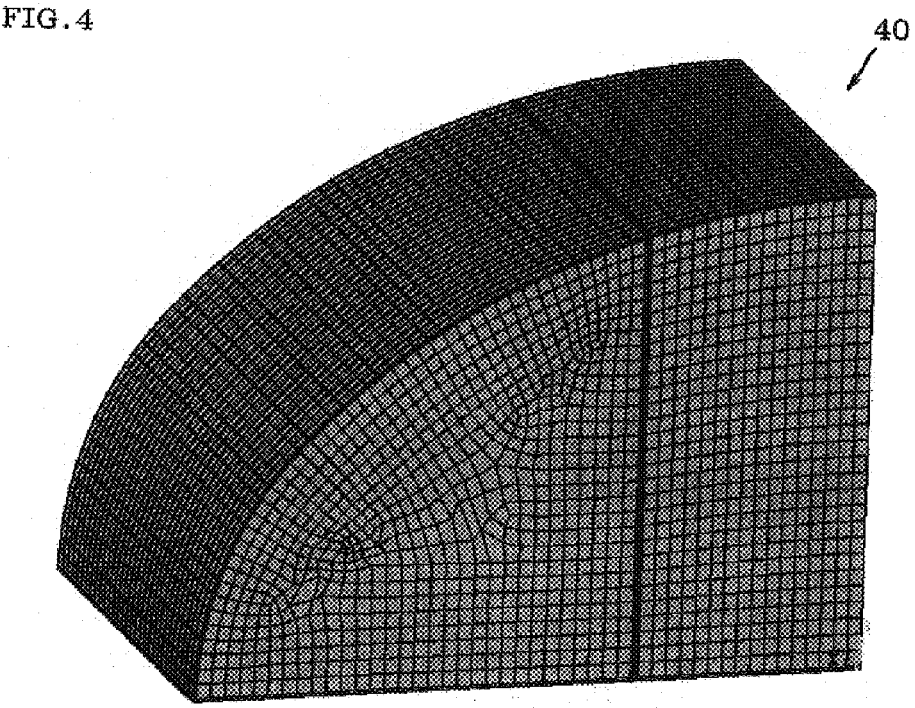
FIG. 4 is a photograph showing a finite element model of an anisotropic solid body which has replaced the honeycomb structure shown in FIG. 3.

A finite element model of the anisotropic solid body of the honeycomb structure 30 is created based on the numerical equation (1). FIG. 4 is a photograph showing the finite element model. The thin lines of a finite element model 40 shown in FIG. 4 indicate element divisions. If the element size is appropriately set (about 0.1 to 10 mm), the number of elements is significantly reduced in comparison with the case of directly creating a finite element model based on the honeycomb structure 30, and the number of nodes and the number of degrees of freedom are also significantly reduced.

Figure 5:
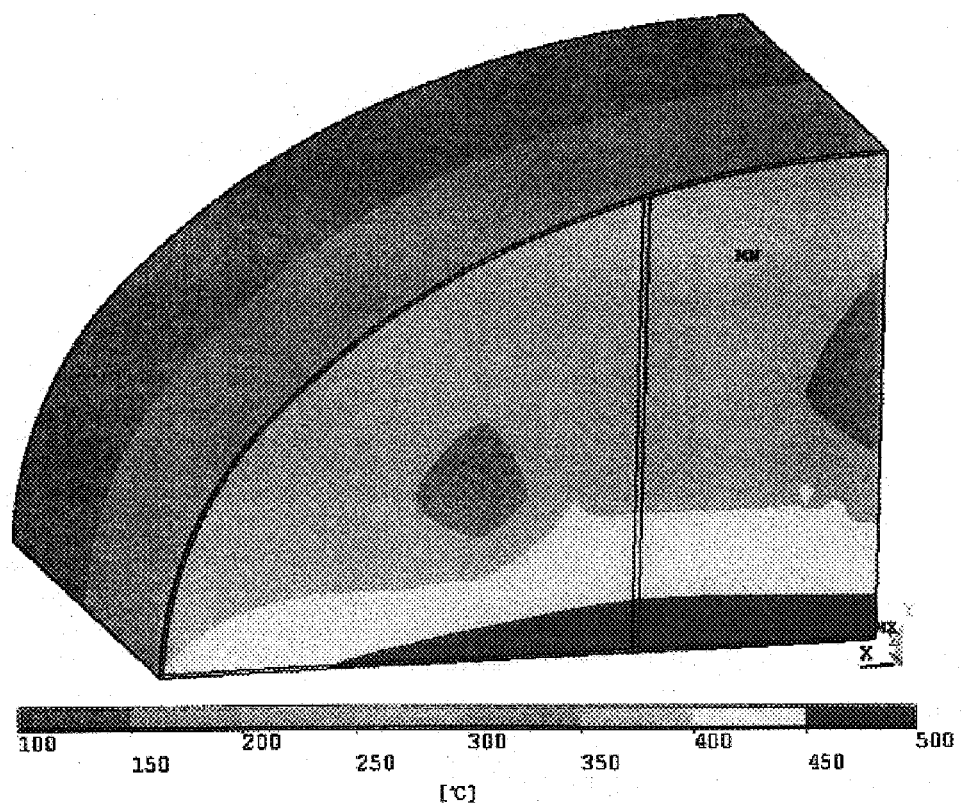
FIG. 5 is a photograph showing the temperature distribution in the finite element model shown in FIG. 4.

A temperature distribution is applied to the finite element model 40. FIG. 5 is a photograph showing the temperature distribution in the finite element model 40. It suffices to apply a temperature to each node of the finite element model 40 based on the actual use condition.

Figure 6:
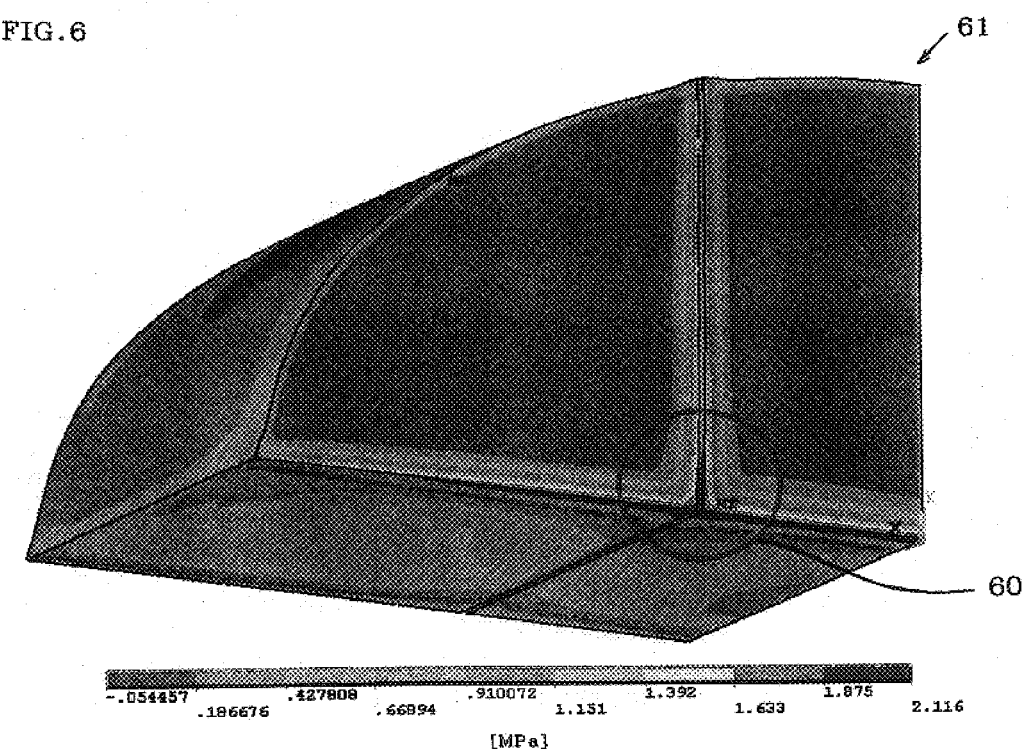
FIG. 6 is a photograph showing the stress distribution in the anisotropic solid body which has replaced the honeycomb structure shown in FIG. 3.

The stress is calculated by performing a finite element analysis based on the applied temperature distribution to determine the stress distribution (see FIG. 6). FIG. 6 is a photograph showing the stress distribution in an anisotropic solid body 61 which has replaced the honeycomb structure 30. In the present invention, since the stress distribution in the anisotropic solid body 61 and the stress distribution in the honeycomb structure 30 correlate to each other, the stress distribution in the honeycomb structure 30 can be calculated based on the stress distribution determined for the anisotropic solid body 61. The above-mentioned is macroanalysis step.

A cell structure portion of which the stress should be calculated as the cell structure is selected based on the stress distribution in the anisotropic solid body. In the following description, since the present embodiment uses the honeycomb structure as the cell structure, the cell structure and the aimed cell structure are respectively referred to as a honeycomb structure and a the selected honeycomb structure. It is preferable that the selected honeycomb structure be selected by selecting a position including the maximum value of the stress E2 calculated using the above numerical equation (2). According to the result of the stress distribution in the anisotropic solid body 61 shown in FIG. 6, a the selected honeycomb structure 60 enclosed by the circle in FIG. 6 is selected, for example. In this example, it is considered that the connection sections 22 in the honeycomb structure 30 differ in rigidity characteristics and thermal expansion characteristics from the partition walls 23, whereby a large amount of stress occurs in the anisotropic solid body 61 in the area in which the sections corresponding to the connection sections 22 intersect.

Figure 7:
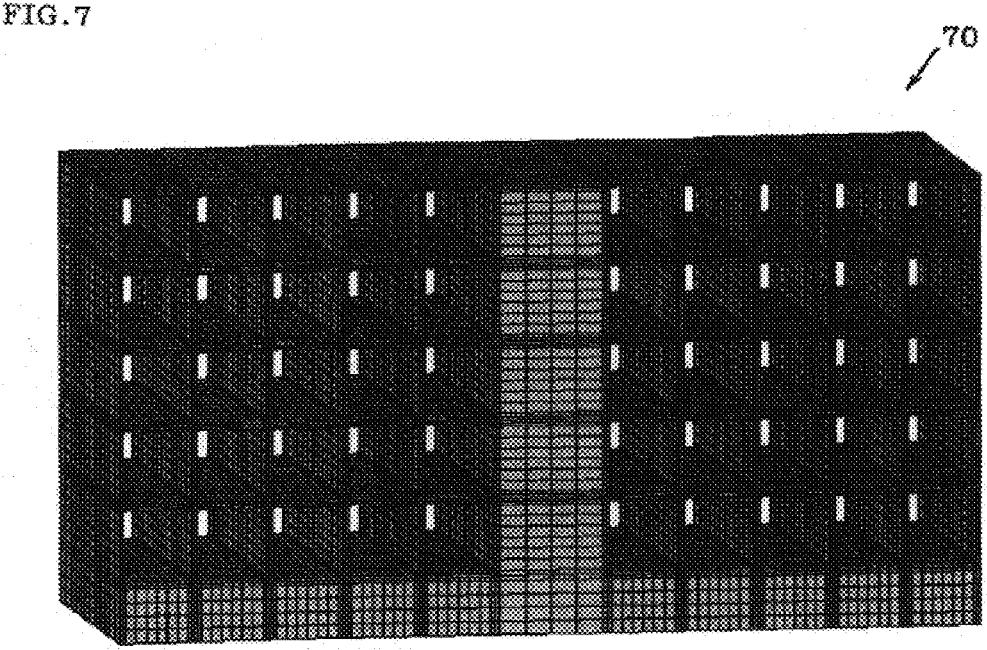
FIG. 7 is a photograph showing a finite element model of a the selected honeycomb structure selected based on the stress distribution shown in FIG. 6.
Figure 26:
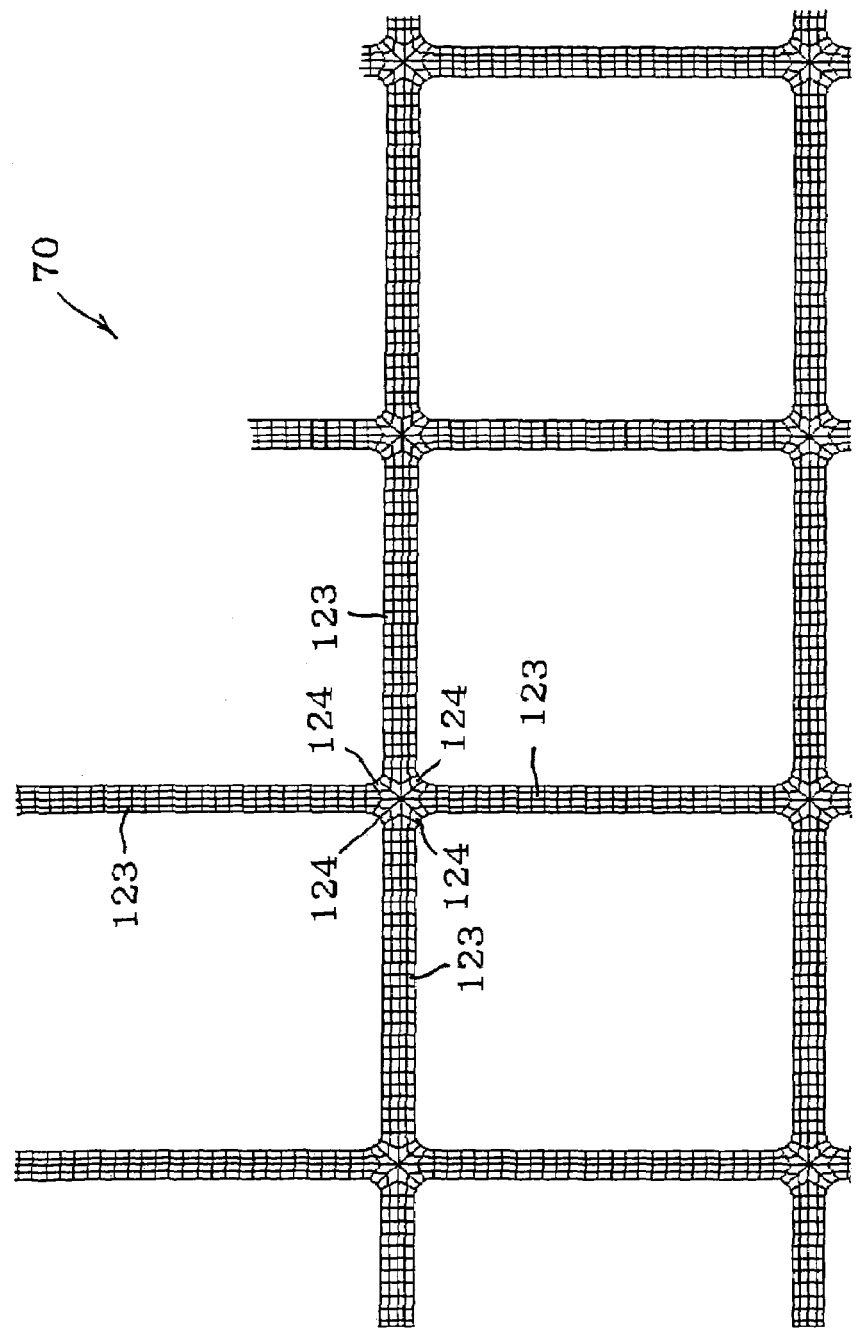
FIG. 26 is an enlarged oblique diagram showing the vicinity of a partition wall intersection curved section (wall intersection curved section) of the finite element model of the the selected honeycomb structure shown in FIG. 7.

A microanalysis step is described below. The microanalysis step is a step of calculating the stress as the cell structure. First, a finite element model of the selected honeycomb structure 60 is created. FIG. 7 is a photograph showing a finite element model (viewed at an angle differing from that of FIG. 6), and FIG. 26 is a partially enlarged diagram of the finite element model. A finite element model 70 shown in FIG. 7 is the model of the selected honeycomb structure 60. The finite element model 70 is not the model as a part of the anisotropic solid body 61, but is the model as a part of the honeycomb structure 30 selected based on the stress distribution in the anisotropic solid body 61. The thin lines of the finite element model 70 shown in FIG. 7 indicate element divisions, and the number of elements, the number of nodes, and the number of degrees of freedom are greater than those of the finite element model of the anisotropic solid body. The element size is suitably about 0.01 to 5 mm. As shown in FIG. 26, the number of element divisions in the thickness direction is four in a partition wall 123 as the wall section in the finite element model 70. The number of element divisions is also four in a partition wall intersection curved section 124 corresponding to the wall intersection curved section in the finite element model 70.

Figure 8:
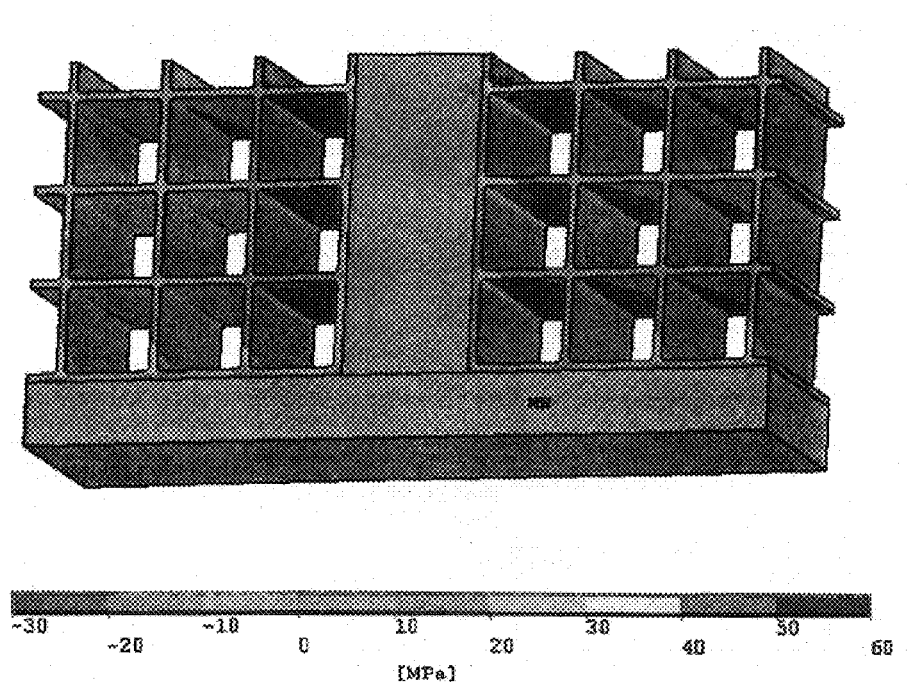
FIG. 8 is a photograph showing the stress distribution in the the selected honeycomb structure selected based on the stress distribution shown in FIG. 6.

A temperature distribution is applied to the finite element model 70 thus created (not shown). It suffices to apply a temperature to each node of the finite element model 70 based on the actual use condition. The accuracy and analytical efficiency are improved by applying a displacement result in the selected honeycomb structure 60 as the microanalysis position obtained by the macroanalysis step as a boundary condition for the finite element model 70. A finite element analysis is then performed to determine the stress distribution in the selected honeycomb structure 60. FIG. 8 is a photograph showing the stress distribution in the selected honeycomb structure 60. The above-mentioned is macroanalysis step.

The distribution shown in FIG. 8 is the stress distribution obtained by the above-described microanalysis step and macroanalysis step. In the present invention, the stress distribution thus obtained is approximately equal to the stress distribution in the area of the honeycomb structure 30 corresponding to the selected honeycomb structure 60 when creating a finite element model as the honeycomb structure having a large number of elements, a large number of nodes, and a large number of degrees of freedom for the entire honeycomb structure 30, applying a temperature distribution to the finite element model, and calculating the stress by performing a finite element analysis to determine the stress distribution over the entire honeycomb structure 30.

The present invention is described below in more detail based on examples. However, the present invention is not limited to the following examples.

EXAMPLE 1

A honeycomb structure A in the shape of a tubular body having a circular cross-sectional shape was provided (not shown). The honeycomb structure A had a cross-sectional diameter of 25.82 mm and an axial length (height) of 10 mm. The cell pitch was 1.47 mm, the partition wall thickness was 0.3 mm, and the radius of curvature at the partition wall intersection was 0.06 mm.

The macroanalysis was performed using a quarter piece of the honeycomb structure A. The quarter piece was replaced with an anisotropic solid body having equivalent rigidity characteristics using the numerical equation (1). The property values of the anisotropic solid body having rigidity characteristics equivalent to the rigidity characteristics of the honeycomb structure A were calculated from the mechanical properties and the dimensions as the honeycomb structure. As the mechanical properties of the honeycomb structure A at 25° C., a Young's modulus of 1 GPa, a Poisson ratio of 0.25, and a coefficient of thermal expansion of $1\times10^{-6}$ were provided for the outer wall, and a Young's modulus of 1 GPa, a Poisson ratio of 0.25, and a coefficient of thermal expansion of $1\times10^{-6}$ were provided for the partition wall.

Figure 19:
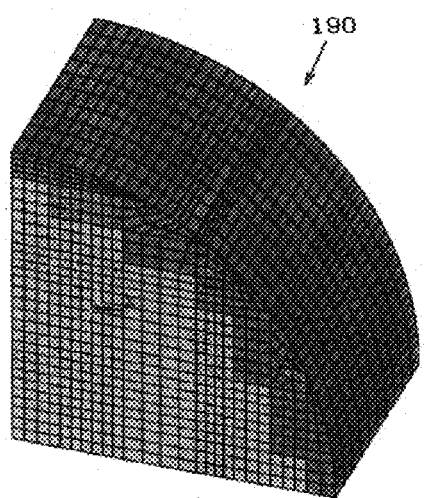
FIG. 19 is a photograph showing a finite element model of an anisotropic solid body which has replaced the honeycomb structure in Example 1.
Figure 20:
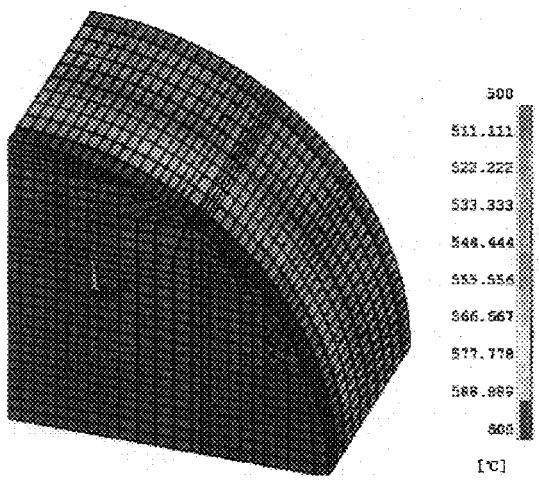
FIG. 20 is a photograph showing the temperature distribution applied to the finite element model shown in FIG. 19.
Figure 21:
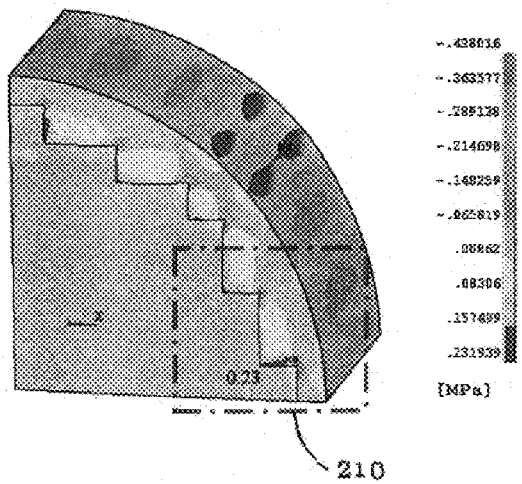
FIG. 21 is a photograph showing the stress distribution in the anisotropic solid body which has replaced the honeycomb structure in Example 1.

A finite element model of the replacement anisotropic solid body was created. FIG. 19 is a photograph showing the finite element model of the replacement anisotropic solid body. The thin lines shown in a finite element model 190 in FIG. 19 indicate elements, and it is understood that the number of elements is small in comparison with a finite element model as the honeycomb structure in Comparative Example 1 as described later (see FIG. 15). The finite element model 190 is the model when the element size was set to 0.1 to 1 mm, in which the number of elements was about 6,500, the number of nodes was about 7,700, and the number of degrees of freedom was about 20,000. After applying a temperature distribution and an external pressure of 1 MPa, the stress was calculated to determine the stress distribution. FIG. 20 is a photograph showing the applied temperature distribution. The temperature distribution was in the range of about 500 to 600° C. The external pressure was applied from the side of the outer wall (curved surface). FIG. 21 is a photograph showing the stress distribution thus determined.

A the selected honeycomb structure 210 shown in FIG. 21 was selected as the honeycomb structure stress calculation target based on the resulting stress distribution (see FIG. 21).

Figure 22:
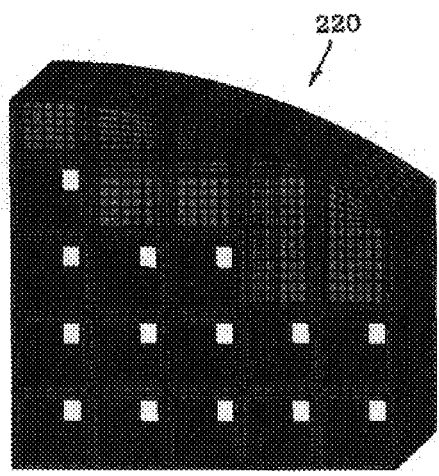
FIG. 22 is a photograph showing a finite element model of a the selected honeycomb structure selected based on the stress distribution shown in FIG. 21.

The microanalysis was then performed. In the microanalysis, a finite element model as the honeycomb structure was created for the selected honeycomb structure 210. FIG. 22 is a photograph showing the finite element model of the the selected honeycomb structure 210. A finite element model 220 of the the selected honeycomb structure 210 shown in FIG. 22 is the model when the element size was set at 0.02 to 0.5 mm, in which the number of elements was about 20,000, the number of nodes was about 20,000, and the number of degrees of freedom was about 70,000.

Figure 23:
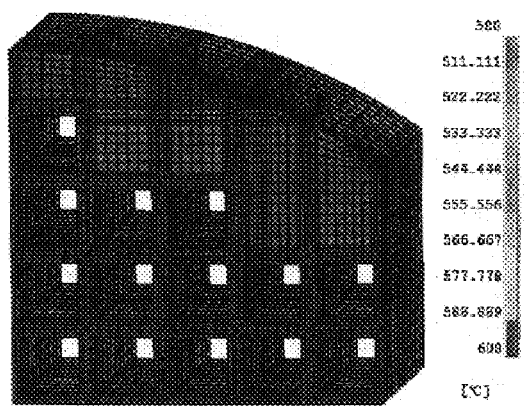
FIG. 23 is a photograph showing the temperature distribution applied to the finite element model shown in FIG. 22.
Figure 24:
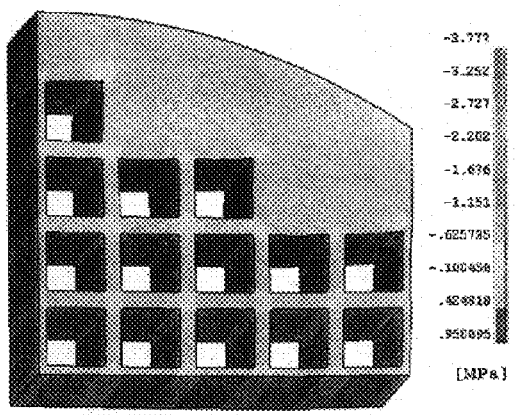
FIG. 24 is a photograph showing the maximum principal stress distribution in a the selected honeycomb structure selected based on FIG. 21.
Figure 25:
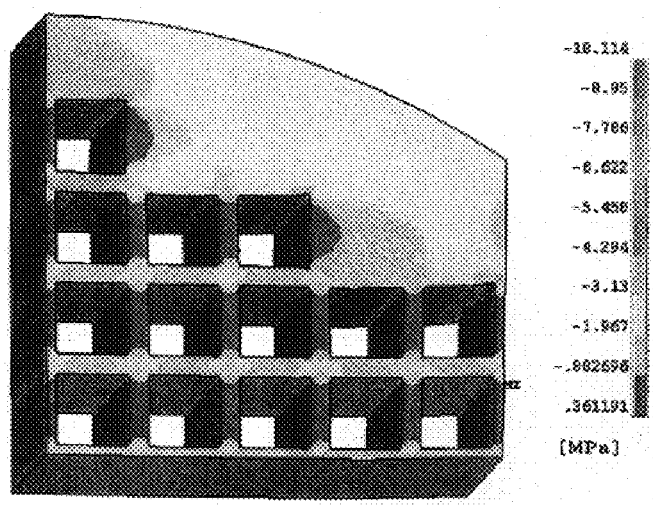
FIG. 25 is a photograph showing the X-axis direction stress distribution in the the selected honeycomb structure selected based on FIG. 21.

After setting a temperature distribution and a boundary condition using the calculation result (data) obtained by the macroanalysis for the finite element model 220, a finite element analysis was performed (stress was calculated) to determine the stress distribution. FIG. 23 is a photograph showing the applied temperature distribution. The temperature distribution was in the range of about 500 to 600° C. FIGS. 24 and 25 are photographs showing the stress distribution. FIG. 24 shows the maximum principal stress distribution, and FIG. 25 shows the X-axis direction stress distribution. The maximum value of the maximum principal stress calculated by stress calculation was 0.95 MPa, and the maximum value of the X-axis direction stress was 0.36 MPa. The maximum amount of outer wall deformation was 0.0305 mm. The calculation time required for the macroanalysis and the microanalysis in Example 1 was about 30 min.

COMPARATIVE EXAMPLE 1

Figure 15:
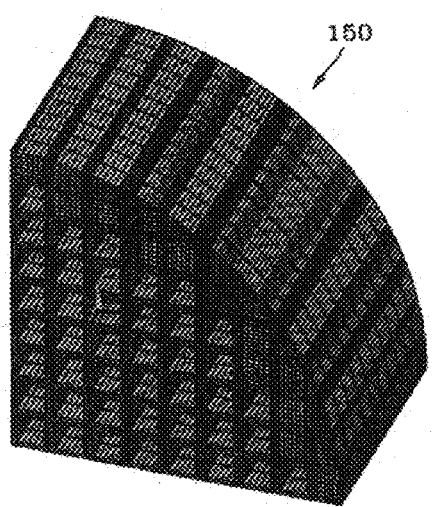
FIG. 15 is a photograph showing a finite element model of a honeycomb structure in Comparative Example 1.

The stress as the honeycomb structure was calculated using a quarter piece of the honeycomb structure A similar to that used in Example 1. Specifically, a finite element model of the quarter piece of the honeycomb structure A was created, a temperature distribution and an external pressure of 1 MPa were applied to the finite element model, and the stress was calculated to determine the stress distribution. FIG. 15 is a photograph showing the finite element model of the quarter piece of the honeycomb structure A. A finite element model 150 shown in FIG. 15 is the model when the element size was set at 0.02 to 1 mm, in which the number of elements was about 60,000, the number of nodes was about 70,000, and the number of degrees of freedom was about 220,000.

Figure 16:
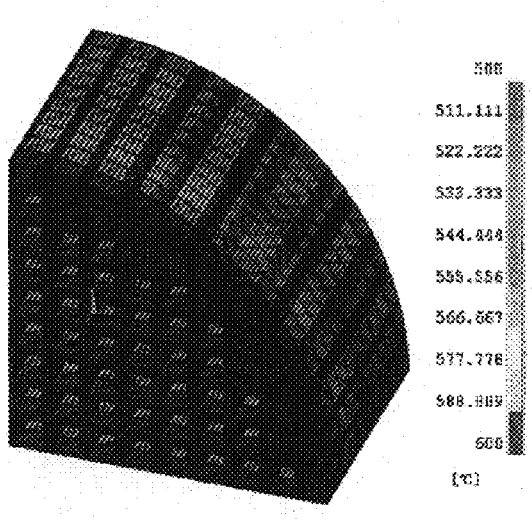
FIG. 16 is a photograph showing the temperature distribution applied to the finite element model shown in FIG. 15.
Figure 17:
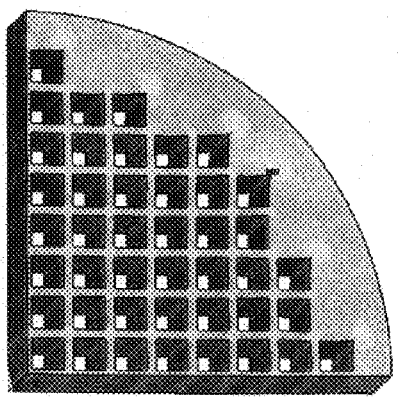
FIG. 17 is a photograph showing the maximum principal stress distribution in the honeycomb structure in Comparative Example 1.
Figure 18:
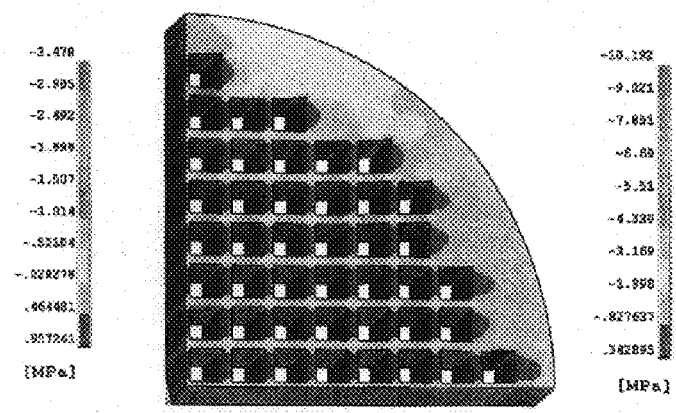
FIG. 18 is a photograph showing the X-axis direction stress distribution in the honeycomb structure in Comparative Example 1.

FIG. 16 is a photograph showing the temperature distribution in the finite element model 150. The temperature distribution was applied according to Example 1 and was in the range of about 500 to 600° C. The external pressure was applied from the side of the outer wall (curved surface). FIGS. 17 and 18 are photographs showing the stress distribution. FIG. 17 shows the maximum principal stress distribution, and FIG. 18 shows the X-axis direction stress distribution. The maximum value of the maximum principal stress calculated by stress calculation was 0.96 MPa, and the maximum value of the X-axis direction stress was 0.34 MPa. The amount and the distribution of the stress were almost equal to those obtained in Example 1. Therefore, it is judged that the distributions of the maximum principal stress and the X axial direction stress calculated from the normal stress and the shear stress are equal. The maximum amount of outer wall deformation in Comparative Example 1 was 0.0306 mm, which was almost equal to that in Example 1. Therefore, it is judged that almost equal stress and deformation could be calculated in Example 1 and Comparative Example 1. The calculation time required for the analysis in Comparative Example 1 was about three hours.

EXAMPLE 2

A honeycomb structure B in the shape of a tubular body having a circular cross-sectional shape was provided (not shown). The honeycomb structure B had a cross-sectional diameter of 20 mm and an axial length (height) of 10 mm. The cell pitch was 1.47 mm, the partition wall thickness was 0.2 mm, and the radius of curvature at the partition wall intersection was 0.5 mm.

The macroanalysis was performed using a quarter piece of the honeycomb structure B. The quarter piece was replaced with an anisotropic solid body having equivalent rigidity characteristics using the numerical equation (1). As the normalized mechanical properties of the honeycomb structure B at 25° C., a Young's modulus of 15, a Poisson ratio of 0.25, and a coefficient of thermal expansion of $1\times10^{-6}$ were used for the partition wall, and a Young's modulus of 1, a Poisson ratio of 0.25, and a coefficient of thermal expansion of $1\times10^{-6}$ were used for the outer wall.

Figure 9:
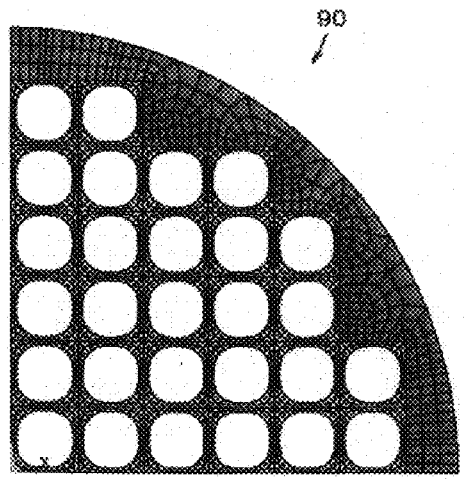
FIG. 9 is a photograph showing a finite element model of a honeycomb structure in Comparative Example 2.
Figure 10:
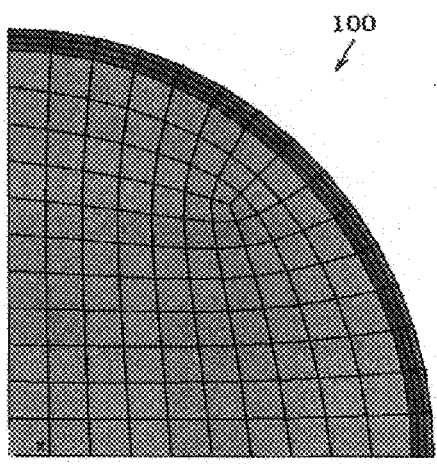
FIG. 10 is a photograph showing a finite element model of an anisotropic solid body which has replaced a honeycomb structure in Example 2.
Figure 11:
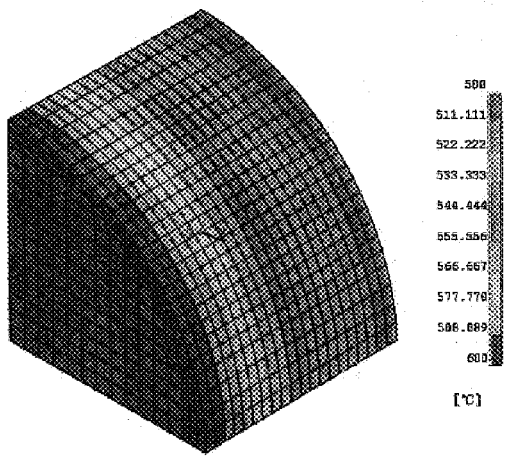
FIG. 11 is a photograph showing the temperature distribution applied to the finite element model shown in FIG. 10.
Figure 12:
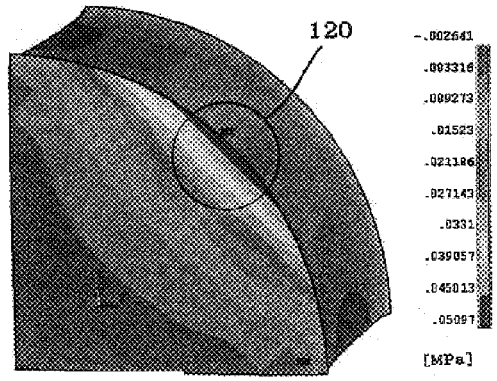
FIG. 12 is a photograph showing the stress distribution in the anisotropic solid body with which the honeycomb structure in Example 2 is replaced.

A finite element model of the replacement anisotropic solid body was created. FIG. 10 is a photograph showing the finite element model of the replacement anisotropic solid body. The thin lines in a finite element model 100 shown in FIG. 10 indicate elements, and it is understood that the number of elements is small in comparison with a finite element model 90 (see FIG. 9) as the honeycomb structure in Comparative Example 2 as described later. The finite element model 100 is the model when the element size was set at 0.1 to 2 mm, in which the number of elements was about 5,000, the number of nodes was about 6,000, and the number of degrees of freedom was about 20,000. After applying a temperature distribution, the stress was calculated to determine the stress distribution. FIG. 11 is a photograph showing the applied temperature distribution. The applied temperature distribution was in the range of about 500 to 600° C. FIG. 12 is a photograph showing the stress distribution.

A the selected honeycomb structure 120 shown in FIG. 12 was selected as the honeycomb structure stress calculation target based on the stress distribution obtained by the macroanalysis (see FIG. 12).

The microanalysis was then performed. In the microanalysis, a finite element model as the honeycomb structure was created for the selected honeycomb structure 120 (not shown). The element size of the finite element model was set at 0.02 to 0.1 mm, in which the number of elements was about 10,000, the number of nodes was about 10,000, and the number of degrees of freedom was about 30,000.

Figure 14:
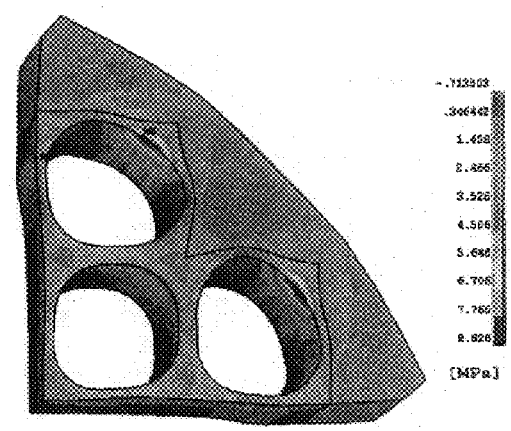
FIG. 14 is a photograph showing the stress distribution in a the selected honeycomb structure selected based on FIG. 12.

After setting a temperature distribution and a boundary condition using the calculation result (data) obtained by the macroanalysis for the finite element model (not shown), a finite element analysis was performed (stress was calculated) to determine the maximum principal stress distribution. The applied temperature distribution was in the range of about 500 to 600° C. FIG. 14 is a photograph showing the maximum principal stress distribution. The maximum value of the maximum principal stress determined by the stress calculation was 8.8. The maximum amount of outer wall deformation was 0.00715 mm. The calculation time required for the macroanalysis and the microanalysis in Example 2 was about 10 min.

COMPARATIVE EXAMPLE 2

The stress as the honeycomb structure was calculated using a quarter piece of the honeycomb structure B similar to that used in Example 2. Specifically, a finite element model of the quarter piece of the honeycomb structure B was created, a temperature distribution (not shown) was applied to the finite element model, and the stress was calculated to determine the stress distribution. FIG. 9 is a photograph showing the finite element model of the quarter piece of the honeycomb structure B. The finite element model 90 shown in FIG. 9 is the model when the element size was set at 0.02 to 1 mm, in which the number of elements was about 40,000, the number of nodes was about 40,000, and the number of degrees of freedom was about 120,000.

Figure 13:
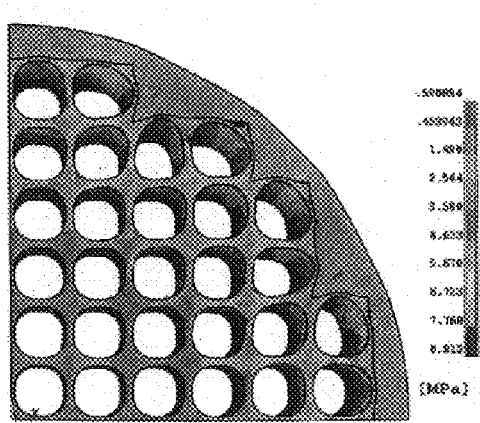
FIG. 13 is a photograph showing the maximum principal stress distribution in the honeycomb structure in Comparative Example 2.

The temperature distribution was applied according to Example 2 and was in the range of about 500 to 600° C. FIG. 13 is a photograph showing the maximum principal stress distribution. The maximum value of the maximum principal stress determined by the stress calculation was 8.8, which was the same as that in Example 2, and the distribution was also similar to that in Example 2. The maximum amount of outer wall deformation in Comparative Example 2 was 0.00700 mm, which was almost equal to that in Example 2. Therefore, it is judged that equal stress and deformation could be calculated in Example 2 and Comparative Example 2. The calculation time required for the analysis in Comparative Example 2 was about four hours.

In Example 2 and Comparative Example 2, pressure was not applied from the outside. In general, thermal expansion (deformation) occurs when the stress occurs due to the temperature distribution (heat), whereby the internal mechanical stress may occur. Therefore, it should be understood that the method for analysis of a cell structure according to the present invention not only is useful for determination of the stress distribution caused by heat, but also may be applied to analyze the mechanical stress which occurs inside the cell structure.

In Examples 1 and 2 and Comparative Examples 1 and 2, a honeycomb structure (cell structure) with a diameter of about 20 to 25 mm was used. However, the actual honeycomb structure used as a catalyst substrate or a filter generally has a diameter of about 100 to 200 mm. In general, the number of degrees of freedom of the finite element model is increased approximately in units of the square of the diameter. Therefore, without the present invention, the number of degrees of freedom of the finite element model is increased by about 16 to 25 times (4×4 (square of four)=16 when the diameter is increased by four times, and 5×5 (square of five)=25 when the diameter is increased by five times) when the diameter of the cell structure is 100 mm, and the number of degrees of freedom of the finite element model is increased by about 64 to 100 times when the diameter of the cell structure is 200 mm.

In general, since the calculation time is almost proportional to the square of the number of degrees of freedom (matrix size), the calculation time is increased by 256 times (square of 16) or 625 times (square of 25) when the diameter of the cell structure is 100 mm, and is increased by 4,096 times (square of 64) or 10,000 times (square of 100) when the diameter of the cell structure is 200 mm, for example. In the present invention, since the number of degrees of freedom of the finite element model of the aimed cell structure when performing the micro calculation is almost the same as that in Example 1 or 2, even if the size of the structure subjected to the macro calculation is increased, the calculation time is not changed to a large extent. Therefore, in the case of a utility cell structure with a diameter of about 100 to 200 mm, the calculation time required for the analysis according to the present invention is at least about one several hundredths of that without the present invention.

The method for analysis of a cell structure according to the present invention is suitably used for a cell structure which is used in an environment in which a large temperature change occurs or to which pressure tends to be applied from the outside. In more detail, the structural analysis method may be suitably used to calculate the stress which may occur inside a honeycomb structure used for an exhaust gas purification device for a heat engine such as an internal combustion engine or combustion equipment such as a boiler, a liquid fuel or gaseous fuel reformer, or the like due to the internal temperature change or pressure applied from the outside.

What is claimed is:

1. A method for analysis of a cell structure for analyzing stress which occurs inside the cell structure due to a temperature distribution which occurs inside the cell structure or pressure applied from outside of the cell structure, the cell structure being in a shape of a tubular body including two end faces and a body face which connects the two end faces, a plurality of cells partitioned by wall sections being formed inside the tubular body in an axial direction of the tubular body, and the cell structure including a repeating structure, formed by the wall sections and the cells, the cell structure being a honeycomb structure, and the cells are parallel passages for fluids, the method comprising:

a macroanalysis step which includes replacing the cell structure or a part of the cell structure with an anisotropic solid body having property values of equivalent rigidity characteristics, creating a finite element model of the anisotropic solid body based on the property values, applying an internal temperature distribution or an external pressure to the finite element model of the anisotropic solid body, calculating the stress, and selecting an aimed cell structure of which the stress should be calculated as a cell structure based on a stress distribution in the anisotropic solid body; and a microanalysis step which includes creating a finite element model of the aimed cell structure, and calculating the stress based on the finite element model of the aimed cell structure to determine a stress distribution in the aimed cell structure, wherein the rigidity characteristics of the anisotropic solid body in the macroanalysis step are expressed by the following numerical equation (1):

$$\begin{pmatrix} \sigma x \\ \sigma y \\ \sigma z \\ \tau xy \\ \tau yz \\ \tau zx \end{pmatrix} = \begin{pmatrix} K11 & K12 & K13 & 0 & 0 & 0 \\ K21 & K22 & K23 & 0 & 0 & 0 \\ K31 & K32 & K33 & 0 & 0 & 0 \\ 0 & 0 & 0 & K44 & 0 & 0 \\ 0 & 0 & 0 & 0 & K55 & 0 \\ 0 & 0 & 0 & 0 & 0 & K66 \end{pmatrix} \begin{pmatrix} \varepsilon x \\ \varepsilon y \\ \varepsilon z \\ \gamma xy \\ \gamma yz \\ \gamma zx \end{pmatrix} \quad (1)$$

σx: X-axis direction normal stress, σy: Y-axis direction normal stress, σz: Z-axis direction (honeycomb passage direction) normal stress, τxy: Y-axis direction shear stress in a plane perpendicular to the X axis, τyz: Z-axis direction shear stress in a plane perpendicular to the Y axis, τzx: X-axis direction shear stress in a plane perpendicular to the Z axis, εx: X-axis direction tensile (or compression) strain, εy: Y-axis direction tensile (or compression) strain, εz: Z-axis direction tensile (or compression) strain, γxy: XY inplane shear strain, γyz: YZ inplane shear strain, γzx: ZX inplane shear strain, K11, K12, K13, K21, K22, K23, K31, K32, K33, K44, K55, and K66: moduli of elasticity.

2. The method for analysis of a cell structure as defined in claim 1, wherein the part of the cell structure replaced with the anisotropic solid body is a piece obtained by equally dividing the entire cell structure into two, four, or eight.

3. The method for analysis of a cell structure as defined in claim 1, comprising: deriving the numerical equation (1) by creating a finite element model as one unit of the cell structure or the part of the cell structure which can be considered to be the repeating structure, calculating an amount of displacement at a representative point by applying external pressure to the finite element model in a plurality of directions, and calculating each of the moduli of elasticity based on the external pressure and the amount of displacement.

4. The method for analysis of a cell structure as defined in claim 1, comprising: deriving the numerical equation (1) using a homogenization method.

5. The method for analysis of a cell structure as defined in claim 1, wherein displacement is calculated in the macroanalysis step together with the stress when applying the internal temperature distribution or the external pressure to the finite element model of the anisotropic solid body, and the displacement is applied in the microanalysis step as a boundary condition for the finite element model of the aimed cell structure.

6. The method for analysis of a cell structure as defined in claim 1, wherein, in the microanalysis step, a number of element divisions in a thickness direction is two or more in the wall section in the finite element model of the aimed cell structure.

7. The method for analysis of a cell structure as defined in claim 1, wherein, in the microanalysis step, a number of element divisions is two or more in a wall intersection curved section in the finite element model of the aimed cell structure.

8. A cell structure of which a stress distribution has been analyzed by using the method for analysis of a cell structure as defined in claim 1, the cell structure having a material fracture stress value greater than a maximum value of the stress which occurs inside the cell structure due to the temperature distribution which occurs inside the cell structure or the pressure applied from outside of the cell structure.

9. A cell structure of which a stress distribution has been analyzed by using the method for analysis of a cell structure as defined in claim 1, the cell structure having a material fracture stress value greater than a maximum value of the stress which occurs inside the cell structure due to the temperature distribution which occurs inside the cell structure or the pressure applied from outside of the cell structure.

10. A method for analysis of a cell structure for analyzing stress which occurs inside the cell structure due to a temperature distribution which occurs inside the cell structure or pressure applied from outside of the cell structure, the cell structure being in a shape of a tubular body including two end faces and a body face which connects the two end faces, a plurality of cells partitioned by wall sections being formed inside the tubular body in an axial direction of the tubular body, and the cell structure including a repeating structure, formed by the wall sections and the cells, the cell structure beng a honeycomb structure, and the cells are parallel passages for fluids, the method comprising:

a macroanalysis step which includes replacing the cell structure or a part of the cell structure with an anisotropic solid body having property values of equivalent rigidity characteristics, creating a finite element model of the anisotropic solid body based on the property values, applying an internal temperature distribution or an external pressure to the finite element model of the anisotropic solid body, calculating the stress, and selecting an aimed cell structure of which the stress should be calculated as a cell structure based on a stress distribution in the anisotropic solid body; and a microanalysis step which includes creating a finite element model of the aimed cell structure, and calculating the stress based on the finite element model of the aimed cell structure to determine a stress distribution in the aimed cell structure, wherein the aimed cell structure is selected in the macroanalysis step by selecting a position including a maximum value of stress E2 calculated using the following numerical equation (2):

$$E2 = C1\sigma_1 x + C2\sigma_1 y + C3\sigma_1 z + C4\tau_1 xy + C5\tau_1 zx + C6\tau_1 yz \quad (2)$$

$\sigma_1 x$: X-axis direction normal stress calculated in the macroanalysis step, $\sigma_1 y$: Y-axis direction normal stress calculated in the macroanalysis step, $\sigma_1 z$: Z-axis direction (honeycomb passage direction) normal stress calculated in the macroanalysis step, $\tau_1 xy$: Y-axis direction shear stress in a plane perpendicular to the X axis calculated in the macroanalysis step, $\tau_1 zx$: X-axis direction shear stress in a plane perpendicular to the Z axis calculated in the macroanalysis step, $\tau_1 yz$: Z-axis direction shear stress in a plane perpendicular to the Y axis calculated in the macroanalysis step, C1: influence weighting factor of the X-axis direction normal stress $\sigma_1 x$, C2: influence weighting factor of the Y-axis direction normal stress $\sigma_1 y$, C3: influence weighting factor of the Z-axis direction normal stress $\sigma_1 z$, C4: influence weighting factor of the Y-axis direction shear stress $\tau_1 xy$ in a plane perpendicular to the X axis, C5: influence weighting factor of the X-axis direction shear stress $\tau_1 zx$ in a plane perpendicular to the Z axis, and C6: influence weighting factor of the Z-axis direction shear stress $\tau_1 yz$ in a plane perpendicular to the Y axis.

11. A cell structure of which a stress distribution has been analyzed by using the method for analysis of a cell structure as defined in claim 10, the cell structure having a material fracture stress value greater than a maximum value of the stress which occurs inside the cell structure due to the temperature distribution which occurs inside the cell structure or the pressure applied from outside of the cell structure.

* * * * *